United States Patent
Park et al.

(10) Patent No.: US 10,572,106 B2
(45) Date of Patent: Feb. 25, 2020

(54) METHOD AND APPARATUS FOR PERFORMING URL LINKAGE FUNCTION USING THE KEYPAD

(71) Applicant: Samsung Electronics Co., Ltd., Suwon-si, Gyeonggi-do (KR)

(72) Inventors: Sehwan Park, Hwaseong-si (KR); Jaeyong Lee, Seoul (KR); Sungwook Park, Goyang-si (KR); Jihoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 15/371,758

(22) Filed: Dec. 7, 2016

(65) Prior Publication Data

US 2017/0083195 A1 Mar. 23, 2017

Related U.S. Application Data

(63) Continuation of application No. 14/282,697, filed on May 20, 2014, now Pat. No. 9,519,403.

(Continued)

(30) Foreign Application Priority Data

Nov. 18, 2013 (KR) .................. 10-2013-0139641

(51) Int. Cl.
*G06F 3/048* (2013.01)
*G06F 3/0482* (2013.01)
*G06F 3/0489* (2013.01)
*G06F 3/0488* (2013.01)
*G06F 3/0484* (2013.01)
*G06F 17/22* (2006.01)

(52) U.S. Cl.
CPC ........ *G06F 3/0482* (2013.01); *G06F 3/04845* (2013.01); *G06F 3/04883* (2013.01); *G06F 3/04886* (2013.01); *G06F 3/04895* (2013.01); *G06F 17/2247* (2013.01)

(58) Field of Classification Search
CPC .............. G06F 3/0482; G06F 3/04845; G06F 3/04883; G06F 3/04886; G06F 3/04895; G06F 17/2247
USPC ...................................... 715/835
See application file for complete search history.

(56) References Cited

U.S. PATENT DOCUMENTS 7,735,021 B2 6/2010 Padawer et al.
8,213,914 B2 * 7/2012 Kim ................ G06F 1/1626
340/407.2

(Continued)

FOREIGN PATENT DOCUMENTS

KR 10-2010-0050948 A 5/2010

*Primary Examiner* — David Phantana-angkool
(74) *Attorney, Agent, or Firm* — Jefferson IP Law, LLP (57) ABSTRACT

A method and an apparatus for performing a Uniform Resource Locator (URL) linkage function using a keypad that changes a screen to a mapped URL when a predetermined key is selected are provided. The method includes displaying the keypad that executes the URL linkage function, sensing a predetermined type of touch generated on a predetermined key existing in the keypad, displaying, in a pop-up menu, a URL item registered in advance on the key, in response to the predetermined type of touch, and changing a screen to a selected URL when a predetermined URL is selected in the pop-up menu.

16 Claims, 11 Drawing Sheets

Related U.S. Application Data

(60) Provisional application No. 61/825,789, filed on May 21, 2013.

(56) References Cited

U.S. PATENT DOCUMENTS

| | | | |
|---|---|---|---|
| 8,745,018 B1 | 6/2014 | Singleton et al. | |
| 9,140,552 B2 | 9/2015 | Pereira et al. | |
| 9,223,472 B2 | 12/2015 | Levee et al. | |
| 9,430,130 B2* | 8/2016 | Matthews | G06F 3/01 |
| 9,450,952 B2* | 9/2016 | Alphin, III | G06F 3/0482 |
| 9,519,403 B2* | 12/2016 | Park | G06F 3/0482 |
| 2002/0115476 A1* | 8/2002 | Padawer | H04M 1/27455 |
| | | | 455/564 |
| 2007/0008130 A1 | 1/2007 | Ashwood Smith | |
| 2007/0061486 A1* | 3/2007 | Trinh | G06F 16/9577 |
| | | | 709/246 |
| 2009/0303676 A1* | 12/2009 | Behar | G06F 1/162 |
| | | | 361/679.27 |
| 2010/0107054 A1* | 4/2010 | Park | G06F 3/04842 |
| | | | 715/234 |
| 2014/0351762 A1* | 11/2014 | Park | G06F 3/0482 |
| | | | 715/835 |
| 2017/0083109 A1* | 3/2017 | Li | G06F 3/04886 |
| 2017/0249072 A1* | 8/2017 | Martin | G06F 3/0238 |

* cited by examiner

METHOD AND APPARATUS FOR PERFORMING URL LINKAGE FUNCTION USING THE KEYPAD

CROSS-REFERENCE TO RELATED APPLICATION(S)

This application is a continuation application of prior application Ser. No. 14/282,697, filed on May 20, 2014, which has issued as U.S. Pat. No. 9,519,403 on Dec. 13, 2016 and claimed the benefit under 35 U.S.C. § 119(e) of a U.S. Provisional application filed on May 21, 2013 in the U.S. Patent and Trademark Office and assigned Ser. No. 61/825,789, and under 35 U.S.C. § 119(a) of a Korean patent application filed on Nov. 18, 2013 in the Korean Intellectual Property Office and assigned Serial number 10-2013-0139641, the entire disclosure of each of which is hereby incorporated by reference.

TECHNICAL FIELD

The present disclosure relates to a method and apparatus for executing a Uniform Resource Locator (URL) linkage function using a keypad that changes a screen to a mapped URL when a predetermined key is selected.

BACKGROUND

As semi-conductive technologies and communication technologies have developed, portable electronic devices have offered increasingly complex functions, such as capturing a picture or video, playing back a music file or a video file, playing a game, receiving broadcasts, supporting wireless Internet, and the like. Particularly, as the wireless Internet functions on electronic devices have advanced, users readily and promptly web surf, irrespective of place, and use of the wireless Internet function has increased. Accordingly, the appearance and User Interface (UI) of an electronic device have been developed variously for useful execution of operations, such as shopping, e-mail transmission, search, and the like, using the wireless Internet function.

Accordingly, a method of readily changing webpages in a portable electronic device is desired.

The above information is presented as background information only to assist with an understanding of the present disclosure. No determination has been made, and no assertion is made, as to whether any of the above might be applicable as prior art with regard to the present disclosure.

SUMMARY

In respect to use of electronic devices, shopping e-mail transmission search through the wireless Internet gradually increases. A portable electronic device has a screen that is relatively smaller than a monitor, which may cause an inconvenience to the user when the portable electronic device displays an Internet page. Particularly, the process of inputting an address into an address bar for changing between webpages may cause an inconvenience in various ways, such as a touch point needing to be moved in the address bar, small-sized keys needing to be selected several times, and the like. Accordingly, there is a desire for a method of readily changing webpages in a portable electronic device.

Aspects of the present disclosure are to address at least the above-mentioned problems and/or disadvantages and to provide at least the advantages described below. Accordingly, an aspect of the present disclosure is to provide a technology that links a Uniform Resource Locator (URL) that a user directly registers in a soft keyboard (for example, a virtual touch keypad or the like) a frequently used URL (or another similar function) so as to readily and promptly change to a new webpage.

In accordance with an aspect of the present disclosure, a method of performing a Uniform Resource Locator (URL) linkage function using a keypad is provided. The method includes displaying the keypad that executes the URL linkage function, sensing a predetermined type of touch generated on a predetermined key existing in the keypad, displaying, in a pop-up menu, a URL item registered in advance on the key in response to the predetermined type of touch, and changing a screen to a selected URL when a predetermined URL is selected in the pop-up menu.

In accordance with another aspect of the present disclosure, a method is provided. The method includes displaying a keypad that executes a URL linkage function, selecting a register button existing in the keypad, and changing a screen to a URL registration page and registering a URL on a predetermined key in response to the selection of the register button.

In accordance with another aspect of the present disclosure, an apparatus for performing a URL linkage function using a keypad is provided. The apparatus includes a display unit configured to display the keypad that executes the URL linkage function and a pop-up menu in association with selection of a predetermined key, a touch sensor configured to sense a predetermined type of touch generated on a predetermined key existing in the keypad, a storage unit configured to storie URL data mapped to the key, and a controller configured to perform a control to change a screen to a selected URL when a predetermined URL is selected in the pop-up menu.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
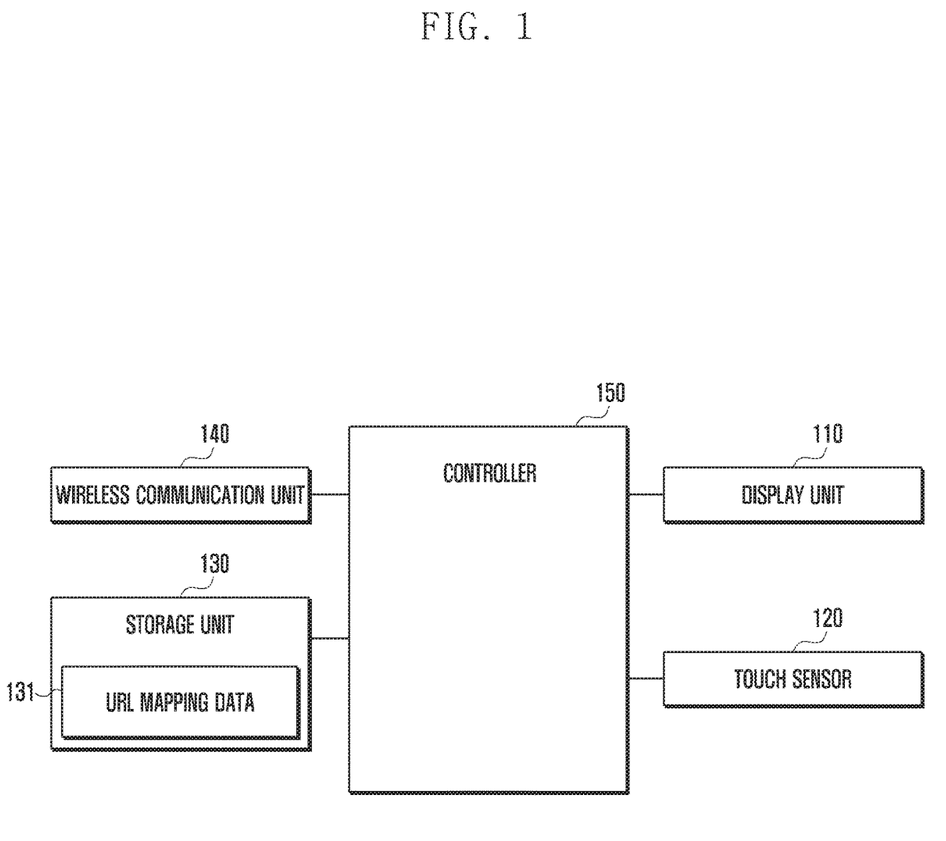
FIG. 1 is a diagram illustrating a configuration of an electronic device according to an embodiment of the present disclosure.

FIG. 1 is a diagram illustrating a configuration of an electronic device according to an embodiment of the present disclosure.

Referring to FIG. 1, an electronic device may be configured to include a display unit 110, a touch sensor 120, a storage unit 130, a wireless communication unit 140, and a controller 150, but is not limited thereto. The display unit 110 and the touch sensor 120 may be formed on an identical screen.

First, the display unit 110 may be formed of a Liquid Crystal Display (LCD), Organic Light Emitting Diodes (OLED), Active Matrix Light Emitting Diodes (AMOLED), and the like. The display unit 110 may visually provide a user with various information, such as an image, a document, a video, and the like, executed in an electronic device. The display unit 110, according to an embodiment of the present disclosure, may provide a user with a screen where a webpage and a keypad are displayed. When a keypad that executes a Uniform Resource Locator (URL) linkage function is displayed according to an embodiment of the present disclosure, the display unit 110 may display a representative value of a mapped URL (for example, a name of a webpage) in a portion of an area where a key is displayed in the keypad. The URL representative value may be automatically set or may be input based on user settings. Also, when a predetermined type of touch input, such as a long touch is executed on a screen where a keypad is displayed, the display unit 110 according to an embodiment of the present disclosure may display a pop-up menu that displays a type of linkable URL. In addition to a type of URL mapped to a selected key, an umlaut corresponding to the key, a special character assigned to the key, a menu for correcting a URL registered in the key, a cancellation menu, and the like may also be displayed in the pop-up menu. Also, when a mapped URL does not exist in the selected key, the display unit 110 may display a registration button for registering a URL on the key. The situation in which the registration button is displayed may not be limited to the case in which a mapped URL does not exist in the selected key. For example, even in the situation in which a plurality of URLs is registered, the registration button may be displayed in the pop-up menu to register an additional URL.

The touch sensor 120 is a device for sensing a touch input of a user. The touch sensor 120 may be driven based on a capacitive overlay scheme, a resistive overlay scheme, an infrared beam scheme, an electromagnetic induction scheme, and the like. In addition to these schemes, any type of scheme that may sense a contact or a pressure of an object may be used for the touch sensor 120. The touch sensor 120 may sense whether a touch input of a user exists and the point at which the touch is provided. The touch sensor may transfer corresponding information to the controller 150. According to an embodiment of the present disclosure, the touch sensor 120 may sense the touch of a user that selects a predetermined key of a keypad displayed on a screen. Particularly, the touch sensor 120 may sense a touch input with respect to a predetermined key on the keypad (for example, a long touch, a drag, and the like). In order to determine whether the touch input corresponds to a predetermined type of touch, the touch sensor 120 may transfer to the controller 150 an electric signal generated when the touch is provided.

The storage unit 130 may store a program and data required for an operation of an electronic device. According to an embodiment of the present disclosure, the storage unit 130 may store data associated with an operation of changing a webpage (for example, an address of a webpage), when a predetermined input is provided on a keypad in the electronic device. Particularly, the storage unit 130 may include a URL mapping data 131 which is information associated with a URL mapped to a predetermined key. The URL mapping data 131 may include a list of URLs assigned to a predetermined key of a keypad, and a representative value of the URL, and the like.

The wireless communication unit 140 may include a wireless frequency-transmitting unit that up-converts and amplifies the frequency of a transmitted signal and a wireless frequency-receiving unit that low noise amplifies and down-converts the frequency of a received signal. According to an embodiment of the present disclosure, the communication unit 140 may execute communication with a server so as to display a webpage and to collect data required for changing a webpage in the electronic device.

The controller 150 may control general operations of the electronic device. According to an embodiment of the present disclosure, the controller 150 may control the display unit 110 to display an Internet page corresponding to a predetermined URL and a keypad that executes a URL linkage function. Based on a signal transferred from the touch sensor 120, the controller 150 may determine whether a predetermined key is touched on the keypad, the type of touch provided on the keypad, and the like. Also, the controller 150 may support the display of a pop-up menu so as to display a type of mapped URL in response to an operation of selecting a predetermined key on the keypad. The controller 150 may also execute a control to change a screen to a selected URL when a predetermined URL is selected in the pop-up menu.

Figure 2:
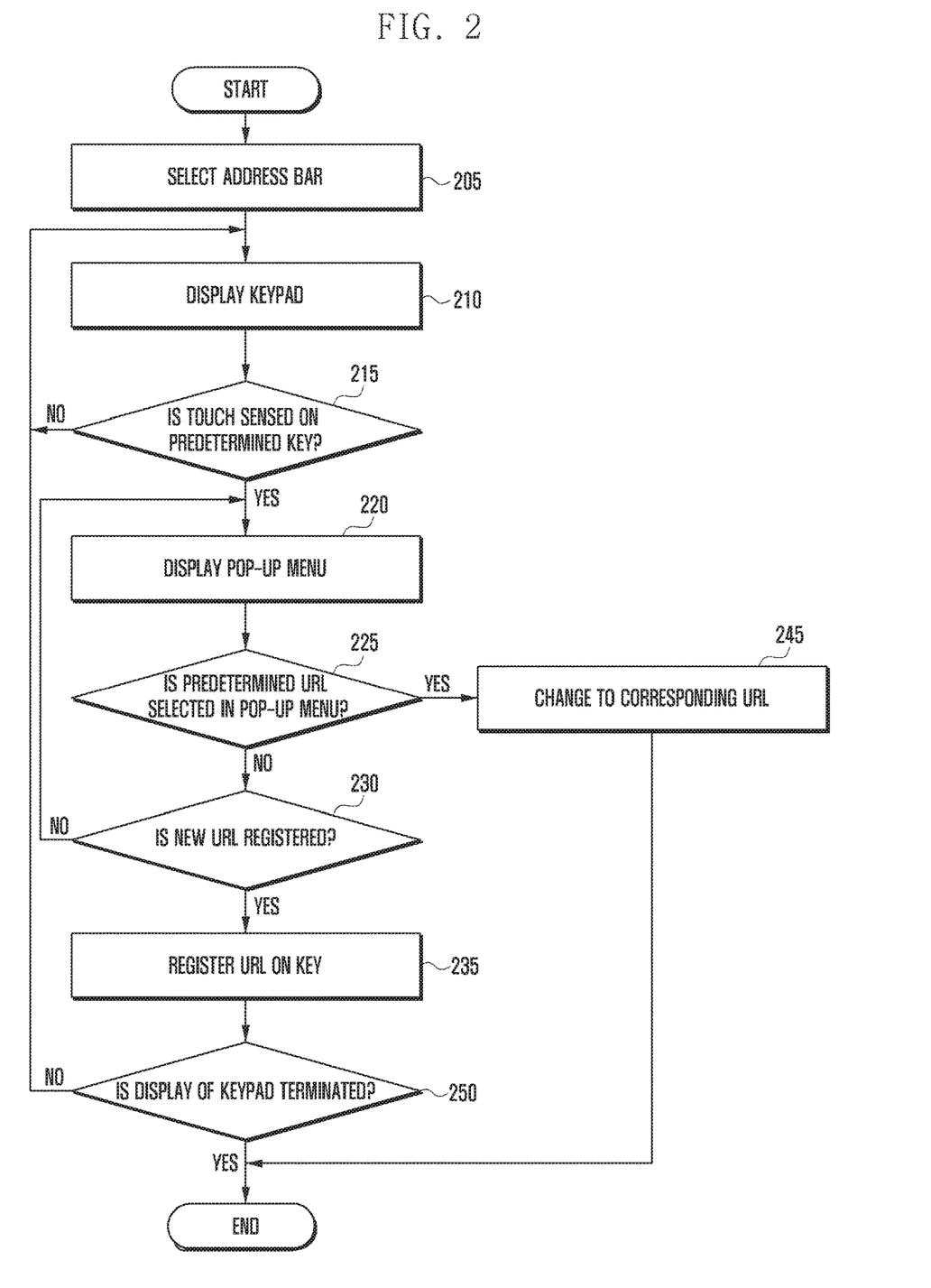
FIG. 2 is a flowchart illustrating an operation executed in an electronic device using a keypad according to an embodiment of the present disclosure.

FIG. 2 is a flowchart illustrating an operation of an electronic device using a keypad according to an embodiment of the present disclosure.

Referring to FIG. 2, the controller 150 of the electronic device may sense that an address bar of a predetermined webpage is selected in operation 205 through a signal input from the touch sensor 120. The controller 150 may distinguish a property of an input field by an application developer. The input field is an area in which text is input, and when the input field is selected, the controller 150 may execute an operation of distinguishing a property of the input field. Therefore, the controller 150 may determine whether a selected input field corresponds to an Internet address bar. According to an embodiment of the present disclosure, the controller 150 may sense a case in which an input field is an e-mail input box, in addition to the case of the Internet address bar.

As described above, the electronic device may display a keypad that executes a URL linkage function, in response to the selection of the address bar, in operation 210. The keypad that executes the URL linkage function may be distinguished from a common keypad by a representative value of a URL written in a portion of each key (for example, in the lower portion, the upper portion, and the like) of a corresponding character of each key and a registration button displayed on the upper portion of a keypad area. Furthermore, the controller 150 may sense whether a predetermined key is selected from the keypad in operation 215. As a method of selecting the predetermined key, for example, a method of inputting a predetermined type of touch may be used. The predetermined type of touch input may correspond to a drag, a long touch, and the like, and predetermined type of touch may be changed to a different type of touch gesture in another embodiment of the present disclosure. The controller 150 may determine that a key corresponding to a point at which the touch is provided is selected when the predetermined type of touch input is sensed. In this example, when selection of a predetermined key in the keypad is not sensed, the controller 150 may display a keypad again in operation 210. Conversely, when the selection of the predetermined key is sensed in operation 215, the controller 150 may display a pop-up menu including a list of URLs mapped to the predetermined key in operation 220. In operation 220, the controller 150 may support the display of a pop-up menu, including at least one of a special character assigned to a selected key, a corresponding umlaut, a type of URL mapped to the key, a button for correcting a URL mapped to the key, a registration button for additionally mapping a URL on the key, and a cancellation button. In the state in which the pop-up menu is displayed, the controller 150 may determine whether a predetermined URL is selected in the pop-up menu in operation 225. In this example, selection of an item in the pop-up menu may be executed at a point where the touch that was generated on the predetermined key is removed. When a predetermined URL is selected in operation 225, the controller 150 may execute an operation of changing a screen to a corresponding URL in operation 245.

Figure 3:
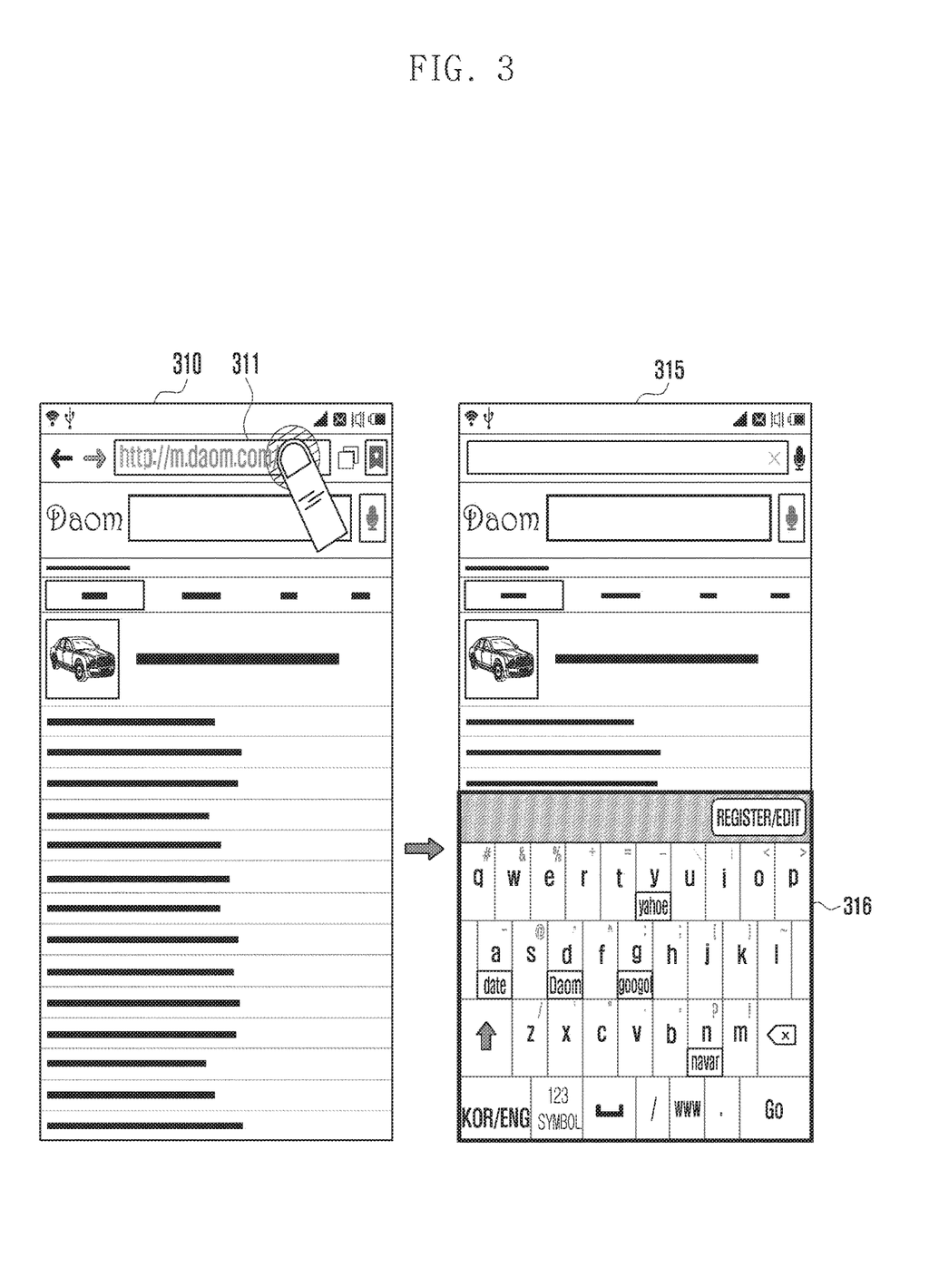
FIG. 3 is a diagram illustrating a process of displaying a keypad that executes a Uniform Resource Locator (URL) linkage function according to an embodiment of the present disclosure.
Figure 4A:
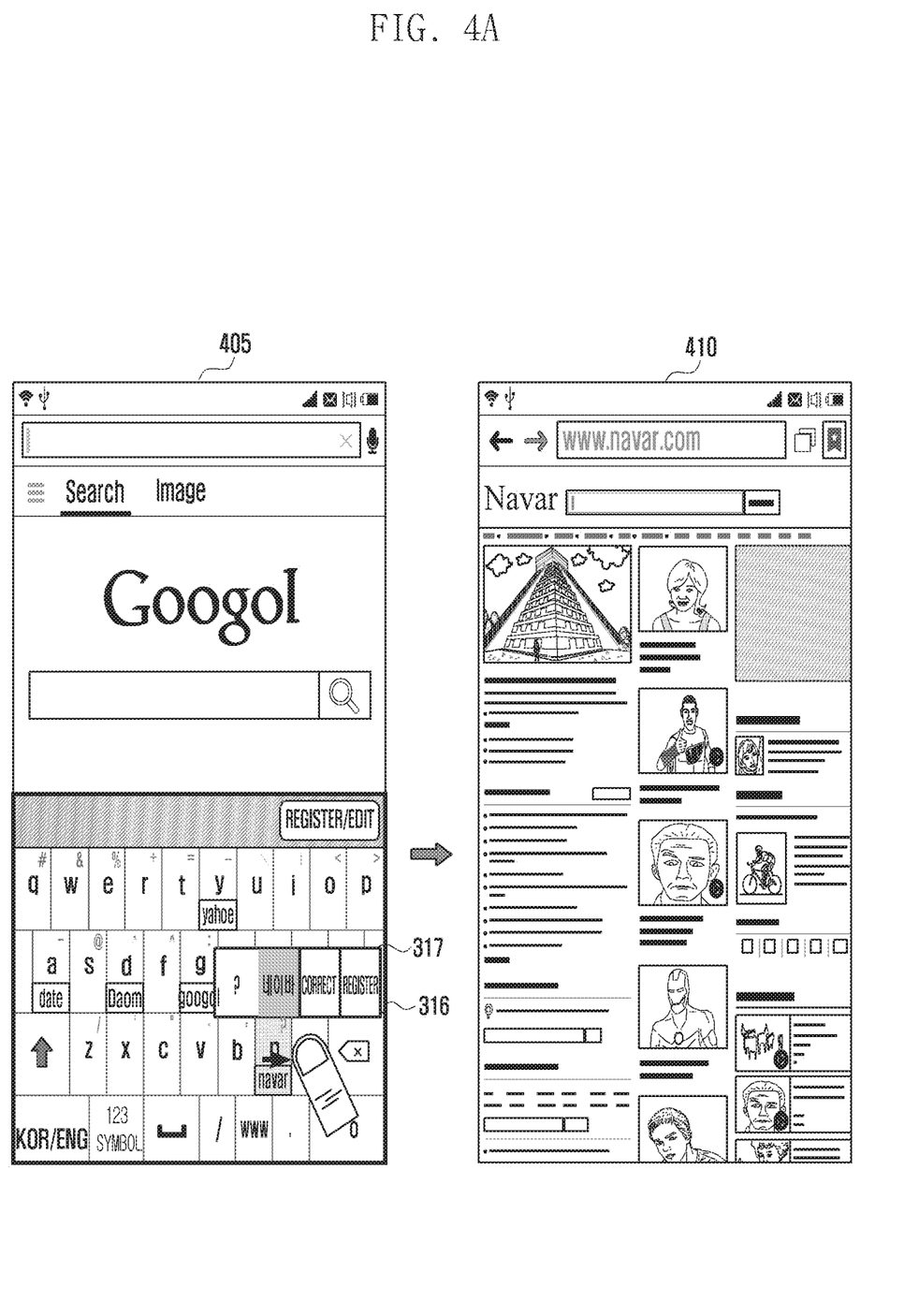
FIGS. 4A and 4B are diagrams illustrating a URL changing process according to an embodiment of the present disclosure.
Figure 4B:
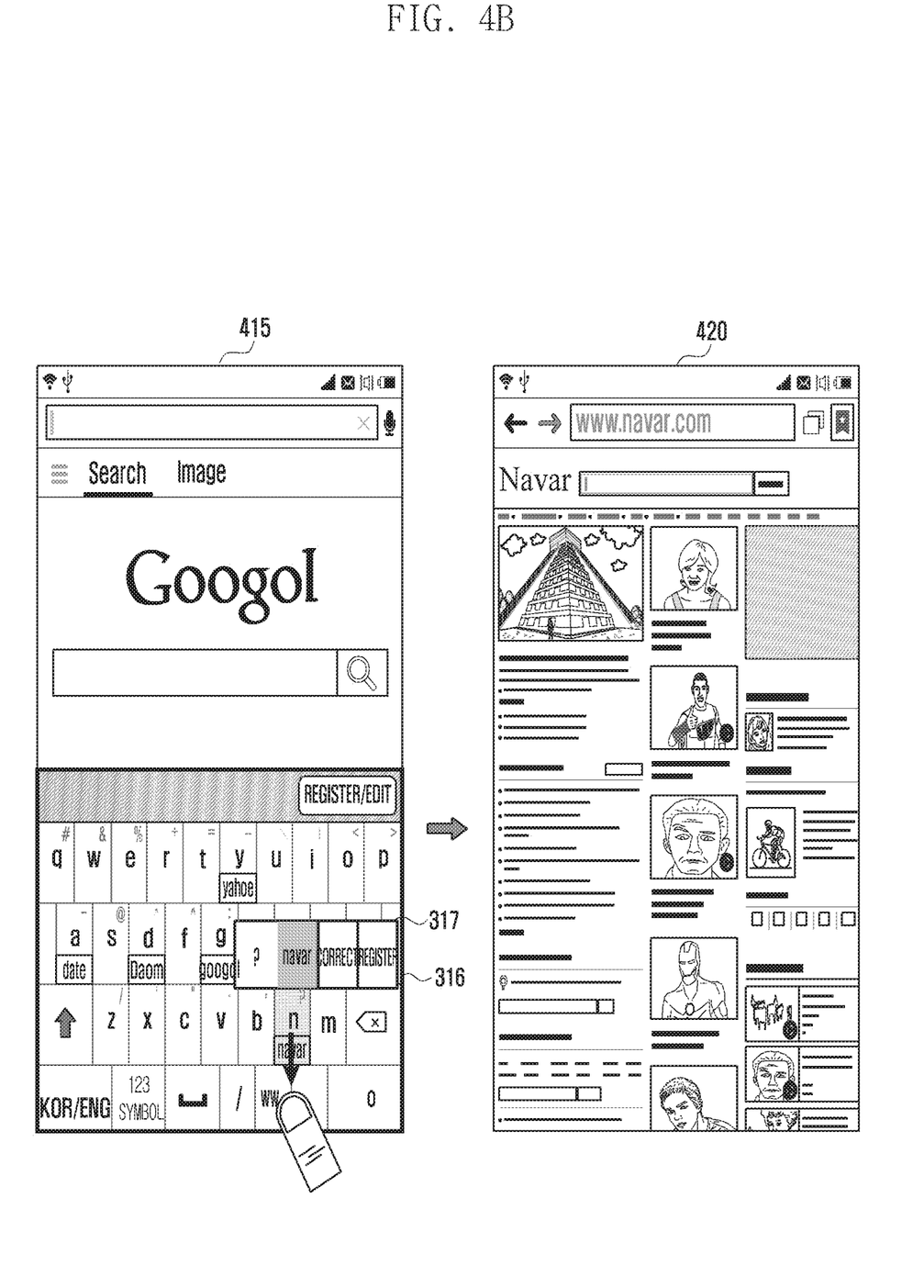

FIGS. 3 through 4B may be used to describe an operation when a predetermined type of touch input is provided on the predetermined key according to an embodiment of the present disclosure.

FIG. 3 is a diagram illustrating a process of displaying a keypad that executes a URL linkage function according to an embodiment of the present disclosure.

Referring to FIG. 3, a diagram 310 illustrates that a webpage is displayed on the display unit 110 of an electronic device and that an address bar 311 shown on the display unit 110 is selected by a user. Accordingly, the diagram 315 illustrates that a keypad 316 that executes a URL linkage function is displayed on the display unit 110. Referring to the keypad 316 in the diagram 315, it is shown that a name of a website is displayed in the lower portion of an area where an alphabet is displayed of a predetermined key. The controller 150 may display on a screen the keypad 316 that executes a URL linkage function when a selected input field is the Internet address bar 311. The keypad 316 that executes the URL linkage function may display a representative value of a mapped URL (for example, a name of a URL) in a portion of each key that has a URL mapped. When a plurality of URLs are mapped to a predetermined key, a priority may be set based on a frequency of use or user settings, and a representative value of a URL having a high priority may be displayed on a keypad. Also, the order of display in the pop-up menu may be based on the priority.

FIGS. 4A and 4B are diagrams illustrating a URL changing process according to an embodiment of the present disclosure.

Referring to FIGS. 4A and 4B, a process of changing a screen to a predetermined URL using the keypad 316 that executes a URL function is illustrated. The diagram 405 of FIG. 4A illustrates that a pop-up menu 317 is displayed as a result of a long touch on a predetermined key in the keypad 316 that executes a URL linkage function. A predetermined URL displayed on the pop-up menu 317 is selected by dragging the touch to the right side. The diagram 410 illustrates that a screen is changed to the selected URL. As described above, when a long touch is executed on a predetermined key in the keypad 316 that executes a URL linkage function, the pop-up menu 317 that displays a type of URL registered on the key may be displayed, and when a predetermined URL is selected in the pop-up menu 317, the screen is changed to the selected URL.

The diagram 415 of FIG. 4B illustrates that the pop-up menu 317 is displayed when a predetermined key is dragged in the lower direction in the situation in which the keypad 316 that executes a URL linkage function is displayed. As described above, the touch motion that calls the pop-up menu 317 may include a drag that is provided in a predetermined direction. However, it is merely an example, and various touch gestures may be used for calling the pop-up menu 317. The diagram 420 illustrates that a screen is changed to a predetermined URL when the predetermined URL is selected in the pop-up menu 317. In this manner, when the pop-up menu 317 is displayed by moving the touch in the lower direction, an item selected when the touch is removed may be selected; thus, a selection location may be adjusted through a drag provided to the left or right side.

When a predetermined URL is not selected in the pop-up menu in operation 225 of FIG. 2, the controller 150 determines whether a button for registering a new URL is selected in operation 230. As the button for registering a URL, a registration button in the pop-up menu may be selected and used. According to another embodiment of the present disclosure, the URL registration button may be displayed in a pop-up menu only when a mapped URL does not exist in a selected key. When registration of a new URL is not requested, the controller 150 may repeat the process of displaying a pop-up menu in operation 220. However, when the registration of a new URL is requested, the controller 150 may register a URL on the key in operation 235. In this example, the controller 150 may display a registration page for registering a URL on the display unit 110. Further, a URL may be mapped to a predetermined key through a process of designating the URL, a representative value of the URL, and the like. When URL registration is executed as described above, the controller 150 may determine whether display of the keypad is terminated in operation 250. When the display of the keypad is not terminated, the controller 150 may execute an operation of continuously displaying a keypad in operation 210. Conversely, when the display of the keypad is terminated, the process of FIG. 2 may be terminated.

Hereinafter, a registering process for mapping a URL to a predetermined key will be described with reference to FIGS. 5A through 6.

Figure 5A:
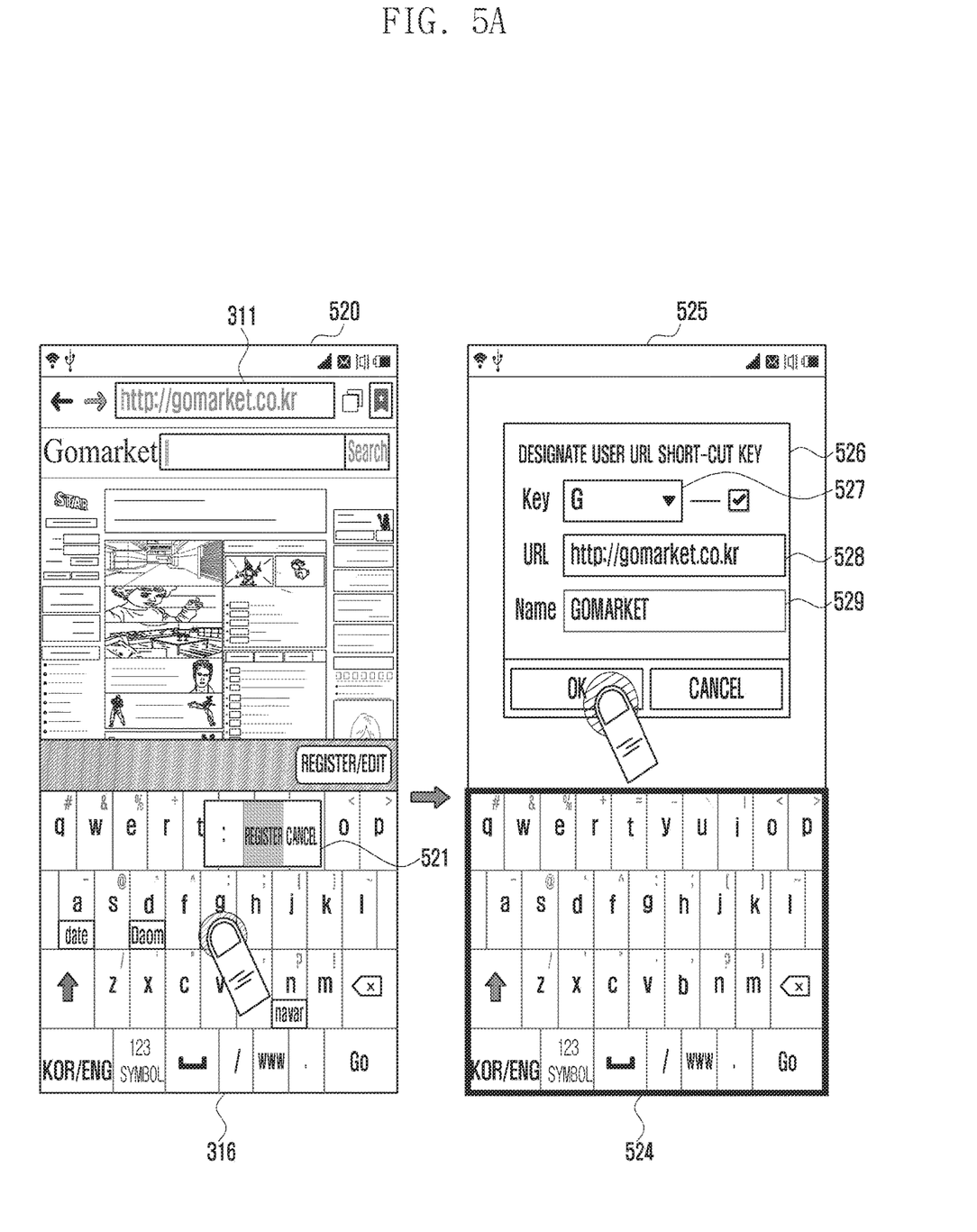
FIGS. 5A and 5B are diagrams illustrating a method of registering a URL on a keypad according to an embodiment of the present disclosure.
Figure 5B:
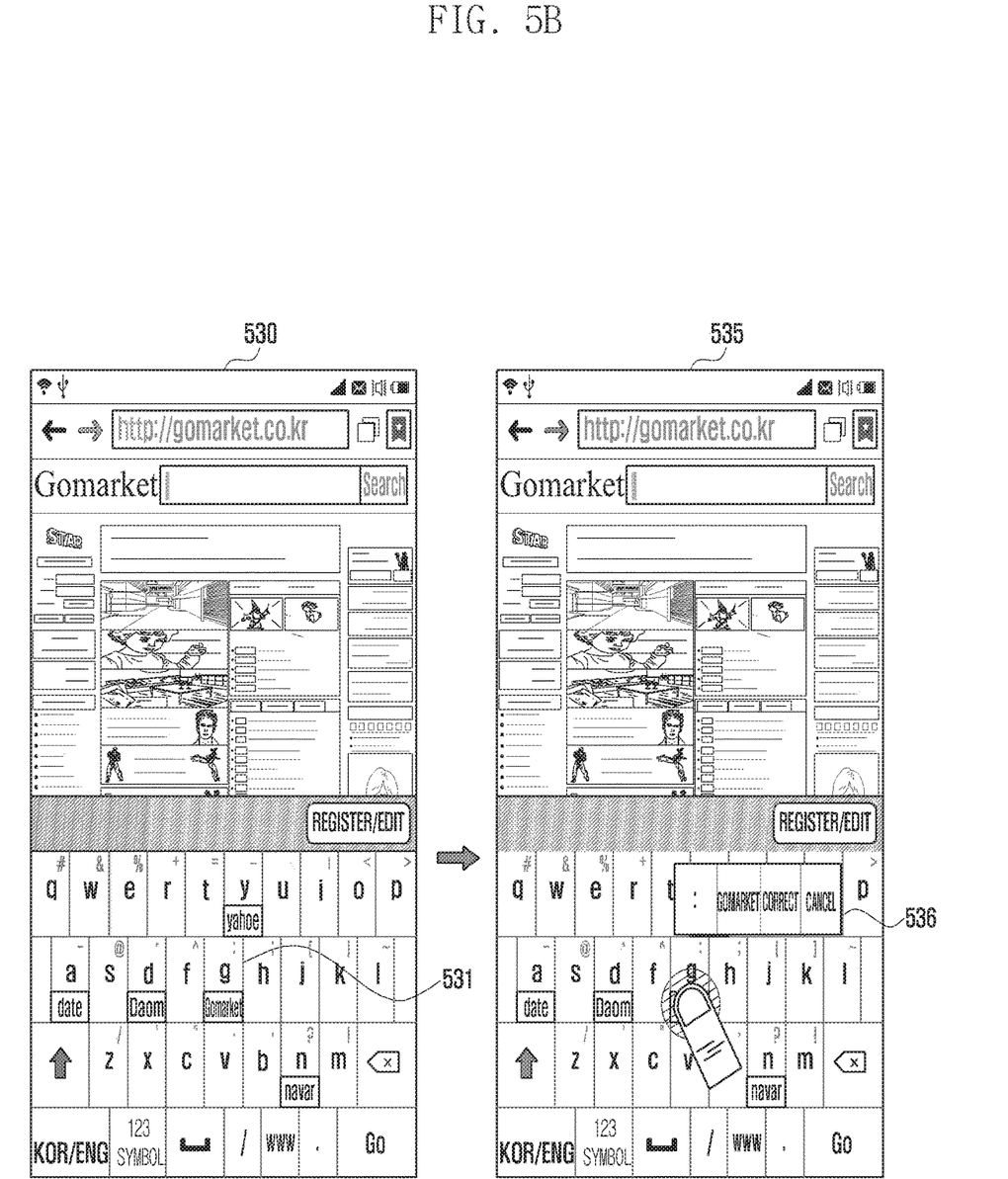
Figure 5C:
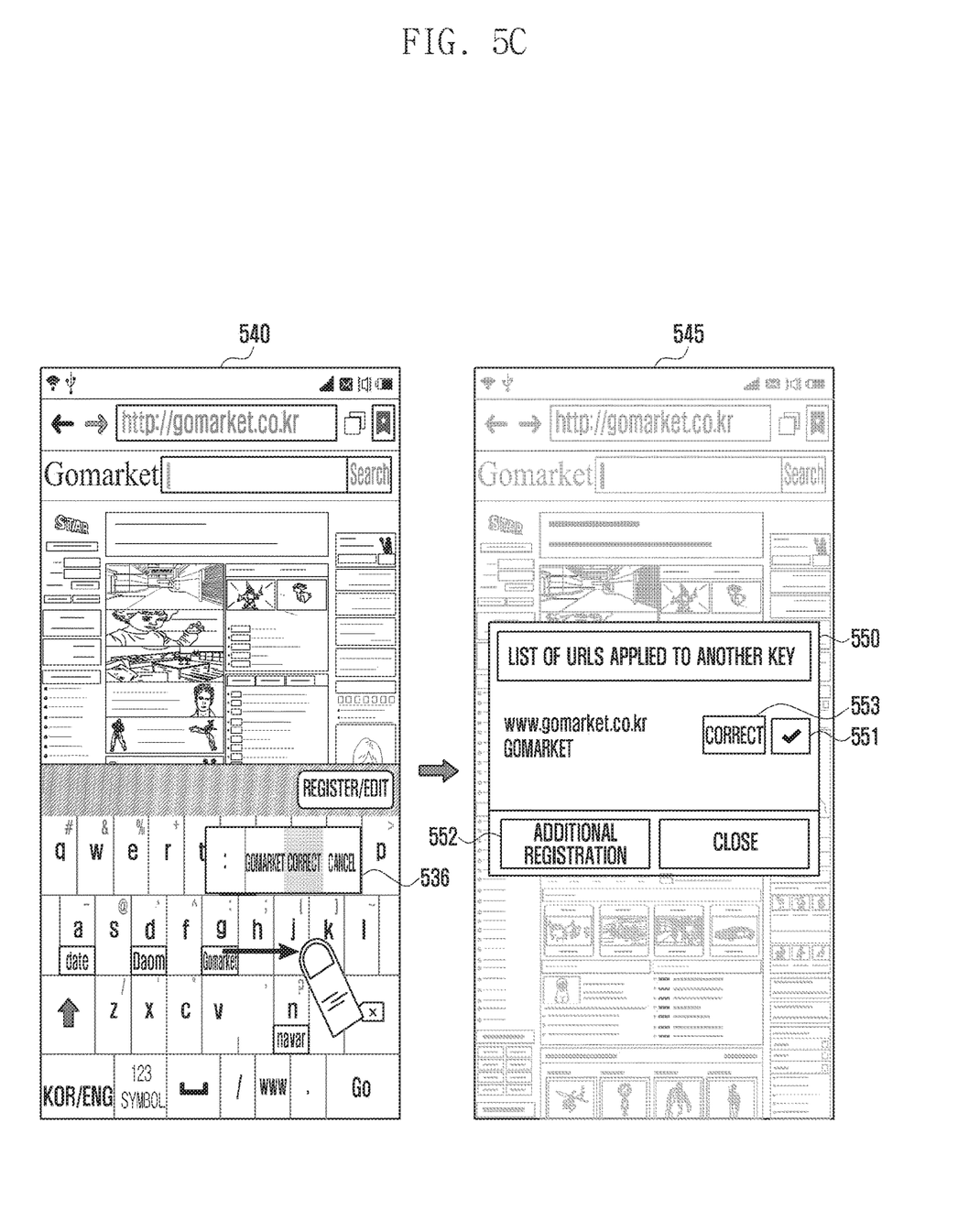
FIG. 5C is a diagram illustrating a process of correcting a mapped URL according to an embodiment of the present disclosure.
Figure 5D:
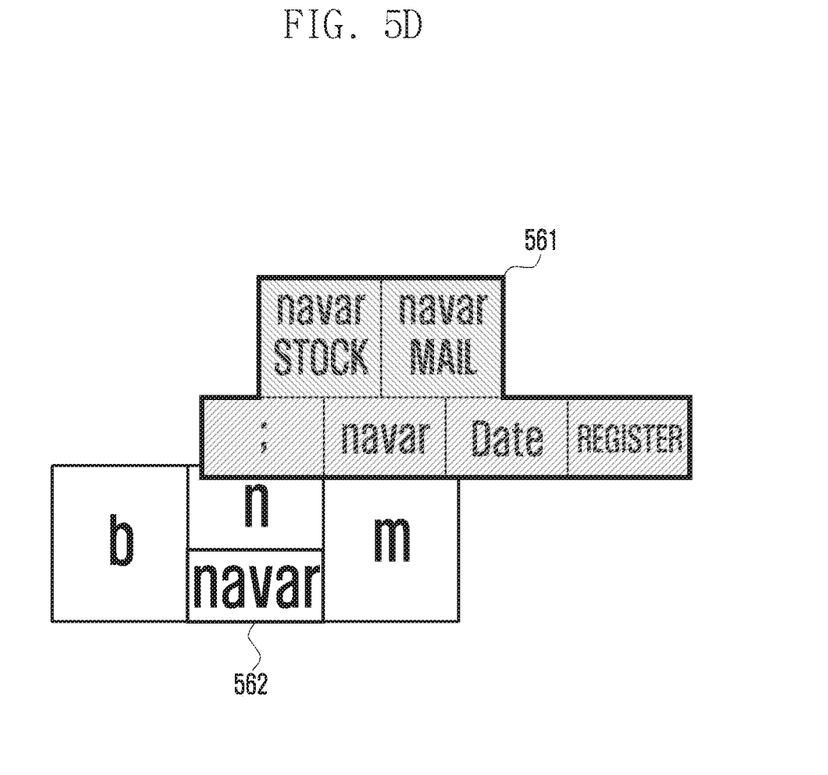
FIG. 5D is a diagram illustrating a sub-URL in a pop-up menu according to an embodiment of the present disclosure.
Figure 5E:
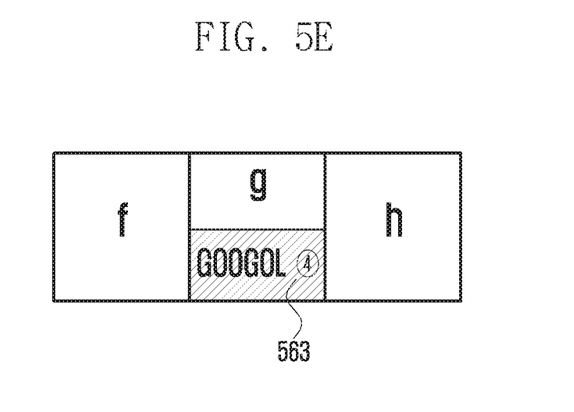
FIG. 5E is a diagram of a keypad showing a state in which a plurality of URLs is registered according to an embodiment of the present disclosure.

FIGS. 5A and 5B are diagrams illustrating a method of registering a URL on a keypad according to an embodiment of the present disclosure. FIG. 5C is a diagram illustrating a process of correcting a mapped URL according to an embodiment of the present disclosure. FIG. 5D is a diagram illustrating an example of displaying a sub-URL in a pop-up menu according to an embodiment of the present disclosure. FIG. 5E is a diagram of a keypad showing a state in which a plurality of URLs are registered according to an embodiment of the present disclosure. FIG. 6 is a diagram illustrating a method of registering a URL on a keypad according to an embodiment of the present disclosure.

Referring to FIGS. 5A and 5B a method of registering a URL using a pop-up menu displayed by selecting a predetermined key in a keypad is illustrated. Referring to the diagram 520, a pop-up menu 521 displayed by selecting a predetermined key is shown in the display unit 110. In the pop-up menu 521, a special character ':' that is assigned to a selected 'g' key may be displayed, and a registration button for registering a URL and a cancellation button for terminating the display of the pop-up menu 521 may be included. The registration button displayed in the pop-up menu 521 may be displayed only when a mapped URL does not exist in a key selected on the keypad. Also, the diagram 520 illustrates an example in which the registration button in the pop-up menu is selected by a user. The diagram 525 illustrates an example in which a URL registration page 526 is displayed on the display unit 110 in response to the selection of the registration button. Items supported in the URL registration page 526 include a short-cut key 527, a URL 528, a URL representative value (a name of website) 529, and information associated with whether URL representative value 529 is displayed on the keypad. Also, the names of the items are temporarily designated to describe the properties, but the names of the items in an actual URL registration page may be changed. As illustrated in FIG. 5A, a value set in the URL item 528 of the URL registration page 526 may be a URL displayed in a state in which a keypad 524 is displayed. In other words, an address of a webpage displayed in the address bar 311 in the diagram 520 may be input in advance in the URL item 528 of the URL registration page 526 in the diagram 525. An initial value selected for the short-cut item 527 in the URL registration page 526 may be set to a selected key (for example, 'g'), for displaying a pop-up menu. The short-cut key item 527 may support a selection list so as to change a set key to another key through selection of a user. A value initially input to the URL representative value item 529 (for example, a name of a website) may be a word extracted from a URL. For example, a main domain name extracted from the URL may be selected to be the URL representative value. Herein, the terminology 'main domain name' is used since it is determined to be the most distinguishing value in an actual domain name, and the main domain name may be set to a word following after, for example, 'WWW.' or 'http://'. Also, with respect to a URL of which a URL representative value is stored in advance (for example, a URL representative value of a predetermined URL which is popular may be stored in advance as a local name), the URL representative value may be extracted from a database that stores the URL representative value. When the items are input, corrected, and registered, a URL representative value mapped to a corresponding key 531 may be displayed as illustrated in the diagram 530 of FIG. 5B. When a popup menu 536 is displayed by selecting again the key, it is determined that the mapped URL is added to the pop-up menu 536 as shown in the diagram 535.

FIG. 5C illustrates a process of correcting a URL registered on a predetermined key.

Referring to FIG. 5C, the diagram 540 illustrates a screen of the pop-up menu 536 displayed by executing a predetermined type of touch on the 'g' key. The pop-up menu 536 includes a button for changing a screen to a URL registered in advance on the selected 'g' key and a button for correcting URL information associated with a URL registered on the selected key. The diagram 545 illustrates that a correction page 550 is displayed when a user selects a correct button in the pop-up menu 536. The correction page 550 includes a correct button 553 for correcting an address of the URL registered in advance and the URL information. When a plurality of URLs is registered, a selection box 551 may be included in the correction page 550 so that a user may select a URL to be displayed on the keypad. An additional registration button 552 may be selected to register another URL in addition to a URL registered on the key. When the additional registration button 552 is selected, a screen is changed to a URL registration page.

A sub-URL (for example, a subordinate category of a predetermined site) that is subordinate to a URL may be displayed together in a pop-up menu. FIG. 5D illustrates a pop-up menu when a plurality of URLs and sub-URLs are registered on a single key.

Referring to FIG. 5D, a pop-up menu 561 is displayed when an 'n' key 562 is pressed, a name of a webpage, such as 'navar', 'date', or the like—including a registration button—may be displayed, and 'navar stock' and 'navar mail' which are subordinate categories of the website 'navar' may be displayed on an upper portion of the 'navar' button.

It has been described that a plurality of URLs may be registered on a single key. In the embodiment described above, a URL representative value (a name of a webpage) having a high priority from among a plurality of registered URLs may be displayed on a keypad. Also, when a predetermined key on which a plurality of URLs is registered is selected and dragged, a page displayed on a screen is changed to a URL having a high priority written on the key. Also, the priority may be set based on the number of accesses, a registration order, user settings, or the like, and an item for setting a priority of a URL may be added to a URL registration page.

FIG. 5E illustrates a method of displaying a key on which a URL is registered according to another embodiment of the present disclosure.

Referring to FIG. 5E, only areas of 'f', 'g', and 'h' in a keypad are illustrated. A character string 'googol' is written on the 'g' key so that it is recognized that a webpage 'googol' is mapped to the 'g' key. Also, a number 563 '4' is written together on the 'g' key, and this is an example of a method of reporting that four URLs, including a URL having a representative value of 'googol', are registered on the 'g' key. Although not illustrated, a method of displaying a small-sized image of a registered URL (for example, a unique mark of a corresponding website) together in a portion of a corresponding key, may be used as a method of displaying a registered URL.

Figure 6:
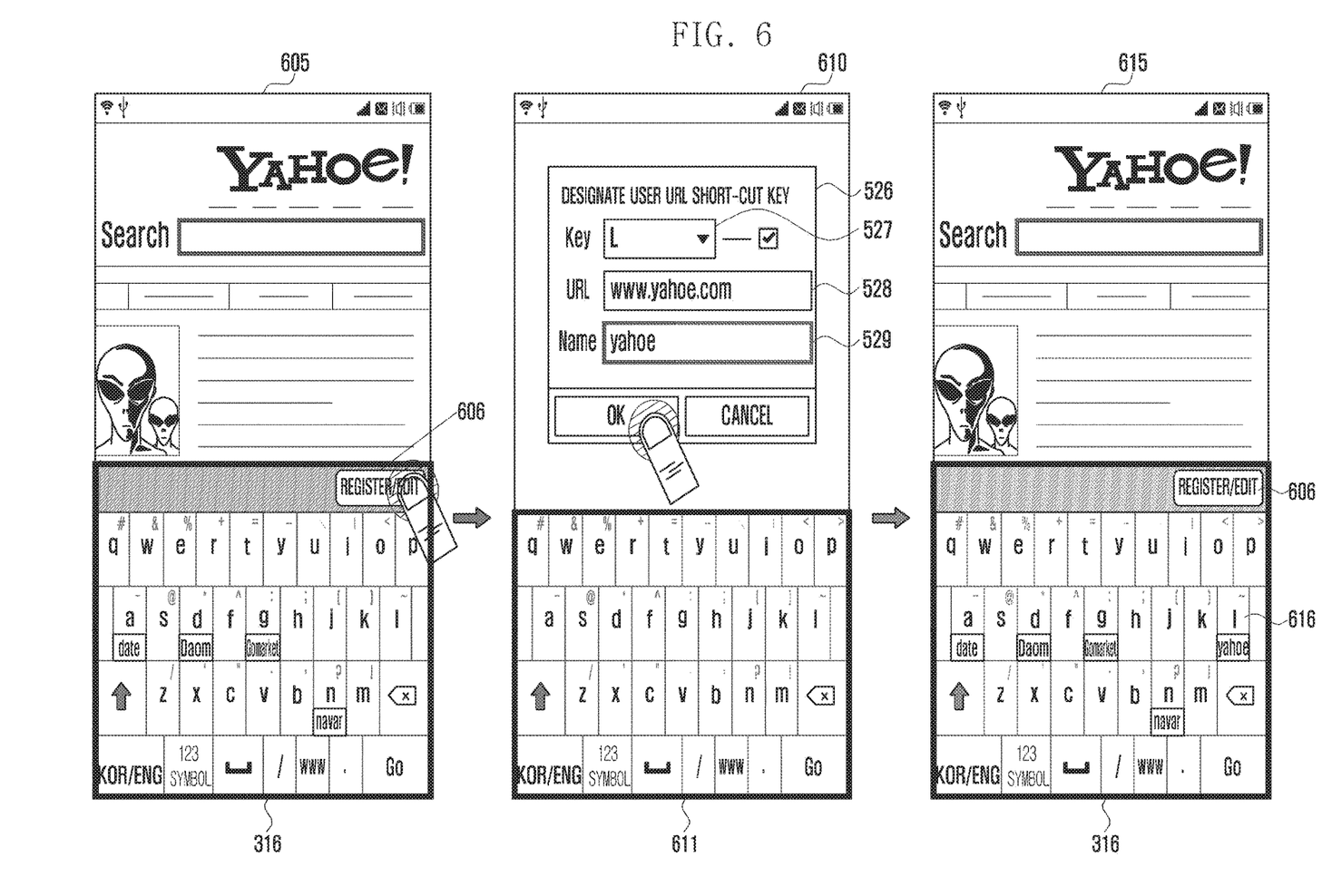
FIG. 6 is a diagram illustrating a method of registering a URL on a keypad according to an embodiment of the present disclosure.

FIG. 6 is a diagram illustrating a method of registering a URL on a keypad according to an embodiment of the present disclosure.

Referring to FIG. 6, as a method of registering a URL in the keypad 316, a method of using a registration button 606 that separately exists in the keypad 316 may be used. The keypad 316 that executes a URL linkage function is displayed in the diagram 605. As previously mentioned, a user may select an address bar on a webpage so as to display the keypad 316 that executes the URL linkage function. When the address bar is selected, the keypad 316 that executes a URL linkage function may be displayed as illustrated in the diagram 605, and the registration button 606 for mapping a URL on a predetermined key may be included in a portion of the keypad. When the registration button 606 existing in a portion of the keypad is selected, a screen may be changed to the URL registration page 526 as shown in the diagram 610. When a screen is changed to a URL registration page by selecting a registration button included in a portion of the keypad, as opposed to selecting a predetermined key, an initial value may not be designated in the short-cut key item 527. The diagram 610 illustrates that the short-cut key item 527 of the URL registration page 526 is set to '1', and a value of 'www.yahoe.com' is input into the URL item 528. A URL displayed on a screen when the registration button 606 is pressed may be set in the URL item 528. In the URL representative value item 529, a URL representative value extracted from the URL may be set as an initial value. As the URL representative value, the first word following after 'www' may be extracted from a URL or a value stored in advance in a database as a URL representative value may be extracted. In the case of the URL representative value stored in advance, local names in a local language may be assigned only for predetermined URLs that are popular. The diagram 610 illustrates that 'yahoe' is input into the URL representative value item 529. The value may be changeable, and a keypad that supports input in the URL registration page 526 may be displayed to be a general keypad 611 in which a URL is not mapped. When URL registration is executed by pressing an OK button, a state of a keypad may be changed as shown in the diagram 615. Referring to an '1' key 616 on the keypad in the diagram 615, 'yahoe' which is the URL representative value of the URL registered in the diagram 610 is displayed in the lower portion of an area where the alphabet is written. As described above, the registration button 606 displayed in a portion of the keypad may be used for registering a URL on a predetermined key.

Figure 7:
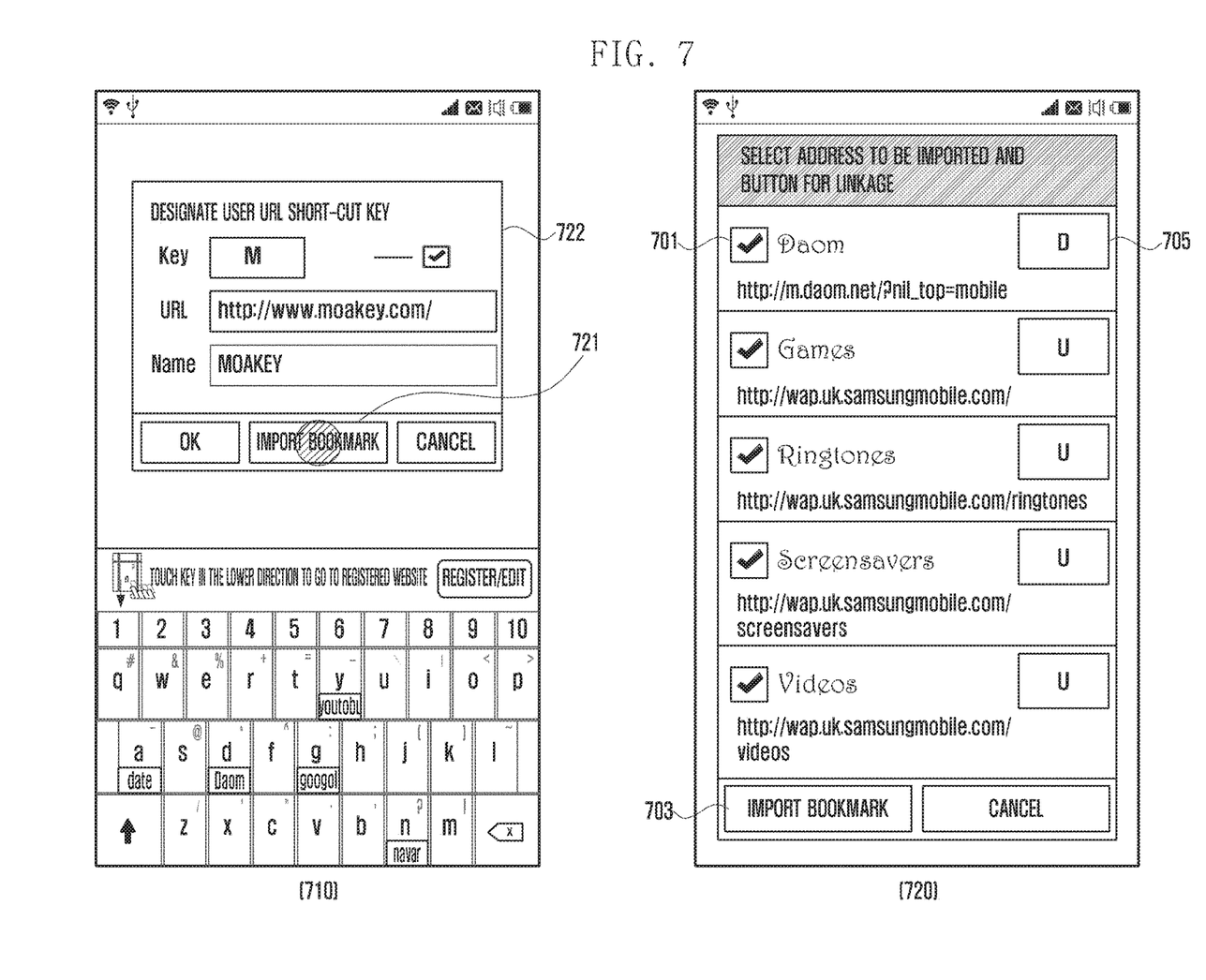
FIG. 7 is a diagram illustrating a method of registering a URL using a bookmark according to an embodiment of the present disclosure.

The URL registration page 526 may additionally include an item for registering a URL using a bookmark. In addition, URL registration using a bookmark may be executed through other schemes. In FIG. 7, an example of a method of registering a URL on a predetermined key using a bookmark will be described.

FIG. 7 is a diagram illustrating a method of registering a URL using a bookmark according to an embodiment of the present disclosure.

Referring to FIG. 7, a diagram 710 includes a URL registration page 722 that may be displayed according to another embodiment of the present disclosure. A bookmark import button 721 may be included in the URL registration page 722. When the bookmark import button 721 is selected, a screen may be displayed as shown in the diagram 720.

As illustrated in the diagram 720 of FIG. 7, a user may select a selection box 701 so as to select, from a bookmark list stored in advance, a URL to be linked with a predetermined key. A key to be assigned for a linkage function may be designated in advance for each URL based on a predetermined rule in the short-cut key menu 705. The predetermined rule may be a rule of designating, as an assigned key, an character that is foremost in a URL (excluding 'www') or an character placed after the first period ('.') after 'http://'. Also, the user may change an initially assigned key to a desired key for designation. When a process of selecting a bookmark list to be imported and designating an assigned key is completed, the user may select a 'bookmark import' button 703 so as to execute mapping the bookmark to the assigned key.

Although not illustrated, as a similar method, the user may sequentially map Internet history (records of order of connection) to a predetermined bundle of keys (for example, number keys) so as to set a linkage function. In this example, as the history list stored in a browser is updated, the history mapped to the key may also be updated and the period of the update may be set by the user.

Meanwhile, the various embodiments of the present disclosure as described above may be implemented in the form of a program instruction that may be performed through various computers, and may be recorded in a computer readable recording medium. The computer readable recording medium may include a program command, a data file, and a data structure independently or in combination. The program command recorded in the medium may be things specially designed and configured for the present disclosure, or things that are well known to and may be used by those skilled in the computer software related art. The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. Further, the program command includes a machine language code generated by a compiler and a high-level language code executable by a computer through an interpreter and the like. The hardware device may be configured to operate as one or more software modules in order to perform operations of the present disclosure, and vice versa.

While the present disclosure has been shown and described with reference to various embodiments therefore, it will be understood by those skilled in the art that various changes in form and details may be made therein without departing from the spirit and scope of the present disclosure as defined by the appended claims and their equivalents.

What is claimed is:

1. A method of performing a uniform resource locator (URL) linkage function using a keypad, the method comprising:
   displaying, on a display of an electronic device, a keypad;
   displaying, on the display, an indicator on a portion of a predetermined key of the keypad displayed on the display, the indicator corresponding to a URL of a webpage;
   receiving a touch gesture on the display corresponding to the predetermined key of the keypad; and
   based on receiving the touch gesture, displaying the webpage associated with the URL corresponding to the indicator of the predetermined key.

2. The method of claim 1, wherein the displaying of the keypad comprises:
   displaying the keypad when a selected input field is an address bar of the webpage.

3. The method of claim 1, wherein the displaying of the indicator on the portion of the predetermined key further comprises:
   displaying the number of URL mapped to the predetermined key.

4. The method of claim 1, wherein the displaying of the indicator on the portion of the predetermined key comprises:
   registering at least one URL on the predetermined key, and when at least two URLs are registered, by setting a priority of the at least one two URLs based on one of a frequency of use by a user or user settings; and
   determining the URL based on the priority as the indicator of the predetermined key.

5. The method of claim 1, wherein the touch gesture is a drag provided on the predetermined key in a predetermined direction.

6. The method of claim 1, wherein the displaying of the keypad comprises:
   displaying a pop-up menu corresponding to the predetermined key when the touch gesture is a gesture for displaying the pop-up menu; and
   when the touch gesture is released from a location of a predetermined URL from among URLs displayed in the pop-up menu and the URL is selected, displaying a webpage associated with the selected URL.

7. The method of claim 1, wherein the indicator of the predetermined key is set by at least one of:
   mapping a bookmark list to the predetermined key of the keypad, or
   mapping a URL list stored in advance in a history item of a browser to a predetermined key group of the keypad in order of history.

8. The method of claim 1, wherein the displaying of the keypad comprises:
   displaying a keypad in which an e-mail address is mapped to a predetermined key when a selected input field is an e-mail input box set for inputting an e-mail; and
   inputting the e-mail address mapped in advance into the input field when a predetermined type of touch input is generated on the predetermined key of the keypad.

9. An apparatus for performing a Uniform Resource Locator (URL) linkage function using a keypad, the apparatus comprising:
   an input unit configured to receive touch inputs;
   a display unit configured to display a screen; and
   at least one processor configured to:
      control to the display unit to display a keypad on the screen,
      control to the display unit to display an indicator on a portion of a predetermined key of the keypad displayed on the screen, the indicator corresponding to a URL of a webpage,
      control to the input unit to receive, via the input unit, a touch gesture associated with a location of the predetermined key of the keypad displayed on the screen, and
      based on receiving the touch gesture, control to the display unit to display the webpage associated with the URL corresponding to the indicator of the predetermined key.

10. The apparatus of claim 9, wherein the at least one processor is further configured to display the keypad if a selected input field is an address bar of the webpage.

11. The apparatus of claim 9, wherein the at least one processor is further configured to display the number of URL mapped to the predetermined key.

12. The apparatus of claim 9, wherein the at least one processor is further configured to:
   register at least one URL on the predetermined key, and if at least two URLs are registered, set a priority of the at least one two URLs based on one of a frequency of use by a user or user settings, and
   determine the URL based on the priority as the indicator of the predetermined key.

13. The apparatus of claim 9, wherein the at least one processor is further configured to receive a drag provided on the predetermined key in a predetermined direction.

14. The apparatus of claim 9, wherein the at least one processor is further configured to:
   display a pop-up menu corresponding to the predetermined key if the touch gesture is a gesture for displaying the pop-up menu, and
   if the touch gesture is released from a location of a predetermined URL from among URLs displayed in the pop-up menu and the URL is selected, display a webpage associated with the selected URL.

15. The apparatus of claim 9, wherein the at least one processor is further configured to set the indicator of the predetermined key by at least one of:
   mapping a bookmark list to the predetermined key of the keypad, or
   mapping a URL list stored in advance in a history item of a browser to a predetermined key group of the keypad in order of history.

16. The apparatus of claim 9, wherein the at least one processor is further configured to:
   display a keypad in which an e-mail address is mapped to a predetermined key if a selected input field is an e-mail input box set for inputting an e-mail, and
   input the e-mail address mapped in advance into the input field if a predetermined type of touch input is generated on the predetermined key of the keypad.

* * * * *